W. BRAMWELL.

Improvement in Egg-Carriers.

No. 130,469.  Patented Aug. 13, 1872.

Witnesses.  
Jas. L. Ewin  
Walter Allen

Inventor.  
William Bramwell  
By Knight Bros  
Atty

UNITED STATES PATENT OFFICE.

WILLIAM BRAMWELL, OF TOLEDO, OHIO.

IMPROVEMENT IN EGG-CARRIERS.

Specification forming part of Letters Patent No. 130,469, dated August 13, 1872.

Specification of an Improved Egg or Fruit Carrier, invented by WILLIAM BRAMWELL, of Toledo, in the county of Lucas and State of Ohio.

*Nature and Objects of the Invention.*

My invention relates to an improvement in boxes or carriers for eggs or fruit; and consists in the employment of frames or sectional pieces hinged together in pairs, and provided with suitable receptacles for the eggs or fruit, said frames being inserted readily into a box fitted to receive them, or capable of being easily removed, at the pleasure of the operator.

Figure 1:
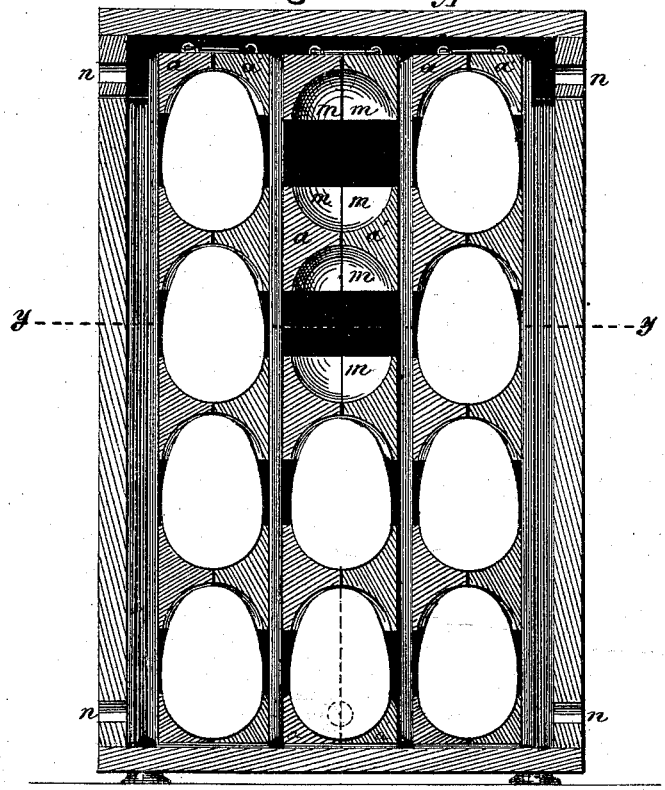
Figure 2:
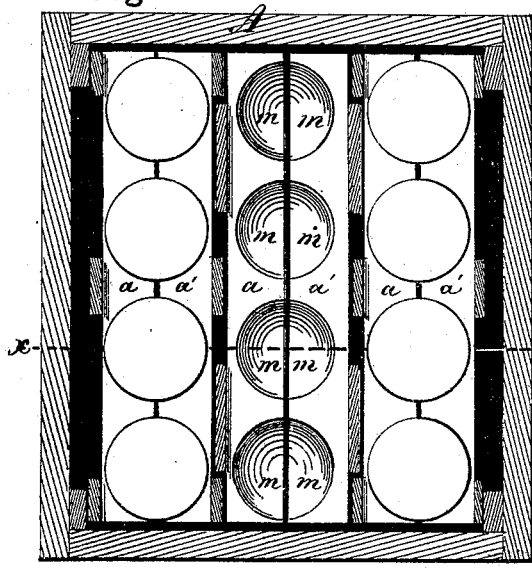

In the accompanying drawing, Figure 1 is a longitudinal sectional view on the line $x\,x$, Fig. 2, of the egg-box, with the frames inserted. Fig. 2 is a horizontal sectional view of the same on the line $y\,y$, Fig. 1; and Fig. 3 is a detached view of one of the frames removed from the box and partially opened.

Figure 3:
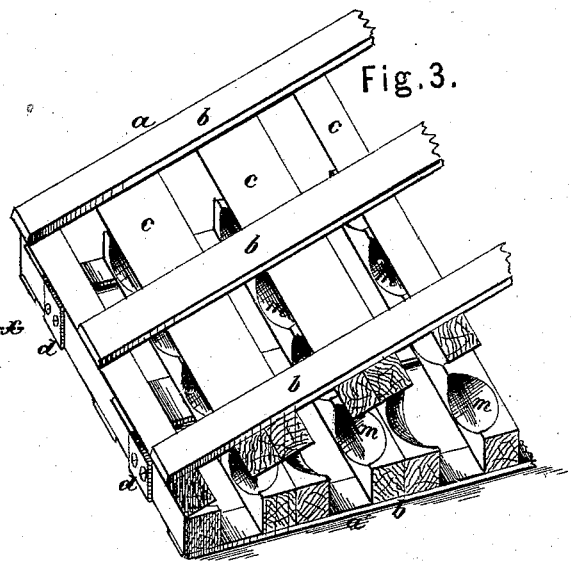

$a\,a$, Fig. 3, represent two frames hinged together at $d$, and consisting of the longitudinal pieces or slats $b\,b\,b$, to which are attached the cross-bars $c\,c$. The latter are separated a short distance from each other in each frame; but each cross-bar $c$ has one similar to it and lying directly opposite in the other frame, as seen in the drawing, and in each a cavity or receptacle, $m\,m$, is made of the shape of a portion of the egg or fruit it is to contain. Similar cavities or receptacles are made in each of the cross-bars $c\,c$ of both frames, so that when the eggs or fruit are introduced into their receptacles and the two frames are closed they will be securely held, and without being in contact with each other, thus preventing bruising or decay and allowing a free circulation of air. After the frames are filled with eggs or fruit and closed they are introduced into a suitable box, A, fitted to receive them, in the cover and sides of which perforations $n\,n$ are made for the passage of air, which, from the open construction of the frames, can freely circulate through them.

When it is desired to dispose of less than the whole contents of the box, a single section or more than one can readily be drawn from the box, the eggs or fruit removed, and the frame or frames again inserted.

Having thus fully described my invention, what I claim as new, and desire to secure by Letters Patent, is—

1. The sectional frame $a\,a$ made in pairs, hinged together, and provided with longitudinal bars $b\,b$ and cross-bars $c\,c$, having cavities or receptacles $m\,m$ for the reception of the articles to be carried, substantially as set forth.

2. The sectional frames hinged together in pairs, and provided with cross-bars $c\,c$, containing cavities or receptacles for the reception of fruit, eggs, &c., in combination with the box A, substantially as described.

WM. BRAMWELL.

Witnesses:
 IRWIN I. MILLARD,
 R. M. McKEE.